J. H. POOLE & A. D. ABBENZELLER.
CUTTER BAR.
APPLICATION FILED OCT. 19, 1909.
974,707.
Patented Nov. 1, 1910.
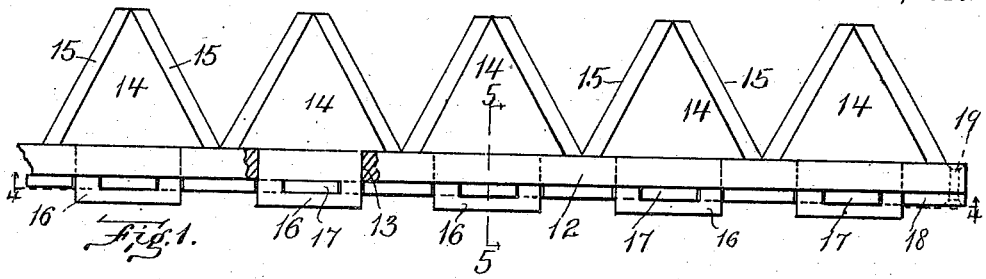
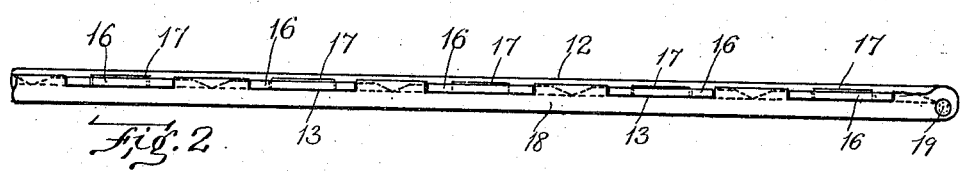
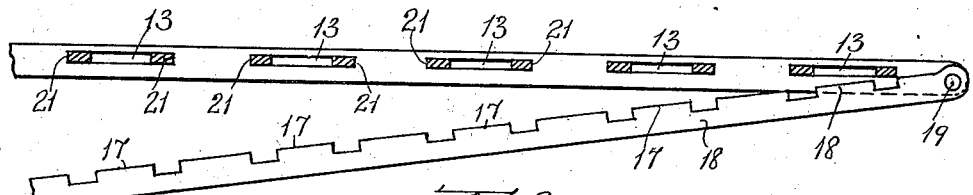
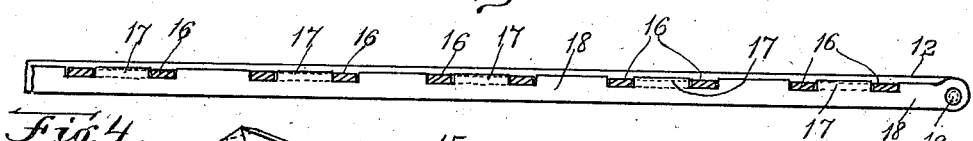
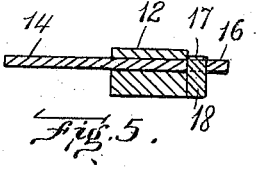
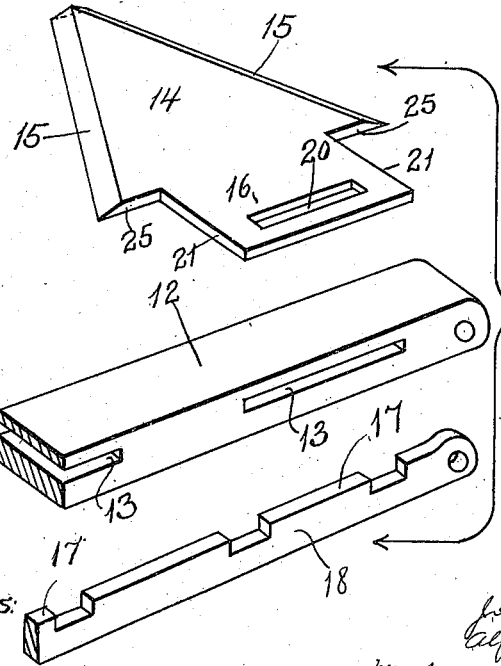

UNITED STATES PATENT OFFICE.

JOHN H. POOLE, OF BROCKTON, AND ALFRED D. ABBENZELLER, OF RANDOLPH, MASSACHUSETTS, ASSIGNORS TO BROCKTON MOWING MACHINE CUTTER BAR COMPANY, OF BROCKTON, MASSACHUSETTS, A CORPORATION OF MASSACHUSETTS.

CUTTER-BAR.

974,707. Specification of Letters Patent. Patented Nov. 1, 1910.

Application filed October 19, 1909. Serial No. 523,385.

*To all whom it may concern:*

Be it known that we, JOHN H. POOLE and ALFRED D. ABBENZELLER, of Brockton and Randolph, respectively, in the counties of Plymouth and Norfolk, respectively, and State of Massachusetts, have invented certain new and useful Improvements in Cutter-Bars, of which the following is a specification.

This invention relates to a reciprocating cutter bar for a mowing machine, the cutter bar being provided with a series of knives which coöperate with fixed fingers carried by a finger bar on which the cutter bar reciprocates.

The invention has for its object to provide an improved construction of a cutter bar and its knives whereby the knives may be simultaneously locked to the cutter bar and simultaneously released, so that any knife may be removed to be sharpened or replaced by another with the minimum expenditure of time and labor.

A further object of this invention is to provide a construction which will require a minimum amount of milling or broaching of the cutter bar and the knives to accurately shape them for close fitting when assembled.

To these ends the invention consists in the construction and combination of parts substantially as hereinafter described and claimed.

Of the accompanying drawings,—Figure 1 represents a top plan view of a cutter bar and a series of knives embodying our present invention. Fig. 2 represents a rear edge view of the structure shown in Fig. 1. Fig. 3 is a view similar to Fig. 2 but with the tongue-carrying bar lowered from its normal position, and the knife-shanks being shown in section. Fig. 4 represents a section on line 4—4 of Fig. 1. Fig. 5 represents a section, somewhat enlarged, on line 5—5 of Fig. 1. Fig. 6 is view showing in perspective one of the knives, and portions of the cutter bar and tongue-carrying bar.

Similar reference characters indicate the same or similar parts in all of the views.

The cutter bar 12 is here shown as rectangular in cross-section and having continuous flat upper and lower sides, the latter being adapted to slide as usual in contact with the finger bar of a mowing machine.

We have not shown the means for reciprocating the cutter bar, and it will be understood that these may of the usual or any suitable character.

Owing to the upper and lower sides of the cutter bar 12 being flat and continuous, the said bar is adapted to slide in the usual manner in contact with a finger bar of a mowing machine, without wearing the bearings in such manner as would be caused by any set-in pieces, screw-holes, pivots or the like.

The cutter bar is provided with a series of slots 13 extending entirely through it from its front to its rear edge, these slots being formed to receive and closely fit the shanks of the knives hereinafter referred to.

The knives 14 have the usual oblique cutting edges 15 adapted to coöperate with the fingers of the usual finger bar in cutting standing grass. Each knife is provided with a shank 16 formed to enter and snugly fit one of the slots 13, the shanks being preferably so proportioned relatively to the width of the cutting bar that when the knives are in position, the rear ends of the shanks project from the rear edge of the cutter bar, as shown in the drawings, so that when the knives are released or unlocked, any knife may be removed by tapping the rear end of its shank with a hammer, provision being thus made for conveniently dislodging and removing the knives and overcoming any difficulties that may attend such removal owing to rust or corrosion of the contacting surfaces of the slots 13 and shanks 16.

The cutter bar is provided with a series of locking tongues 17 which are formed on a bar 18. Said bar is pivoted at 19 to one side of the cutter bar 12, the arrangement being such that when the bar 18 is swung on its pivot, it moves to and from a position along the edge of the cutter bar 12, and the tongues 17 are moved crosswise of the plane of the series of slots 13. To hold the locking bar in its closed position along the cutter bar 12, any suitable latch or lock mechanism may be employed, such for instance as shown in our application filed June 9, 1909, Serial No. 501,059. As such latching or locking or holding means form no part of our present invention, illustration thereof is omitted as it is obvious that anything at all that will hold the two bars in their relative positions shown in Figs. 1 and 2, will cause the locking tongues 17 to project across portions of the slots 13 and engage the slots 20 formed in the knife shanks, thus locking the knives in place. When the locking bar 18 is displaced, as indicated in Fig. 3, the tongues 17 are withdrawn simultaneously from engagement with the knife shanks, the knives being therefore simultaneously released, so that each is free to be ejected from the cutter bar. The knife shanks 16 are provided with slots 20 formed to engage the locking tongues 17, and the preferred formation is that shown in Figs. 1 and 5 wherein the side edges of the shanks form shoulders 21, so that portions of the bar 18 between the tongues 17 will engage the shoulders 21 and aid in withstanding or opposing lateral movement of the knife shanks. The base of each knife is provided with outwardly projecting shoulders 25 adapted to bear on the front side of the cutter bar, and limit the rearward movement of the knife-shanks into the cutter bar, so that the knives are rigidly supported by the cutter bar against rearward displacement, and are prevented from exerting pressure on the locking bar tending to spring the same rearwardly. This structure also enables the slots 20 in the knife-shanks to be made of a width so that the front wall of the slot of any knife need not bear against the locking tongues. The shoulders 25 prevent any rearward movement of the knives relatively to the cutter bar, the outer faces of the tongues 17 prevent any forward movement of the knives, and the ends of the tongues 17 engaging the ends of the slots 20, and the shoulders 21 engaging the ends of the slots 13 of the cutter bar, prevent any lateral movement of the knives in a direction lengthwise of the bar.

It will now be understood that the construction described and illustrated provides a very strong cutter bar which requires very little broaching to form the slots 13, and very little milling to form the tongues 17 on the bar 18. And the knives are exceedingly simple and require little machine work in their manufacture.

We claim:

1. A cutter bar having a series of transverse slots open at the front side of the bar, a series of knives having shanks formed to enter said slots, and a series of connected locking tongues movable crosswise of the plane of the series of slots, and adapted to engage and release the knives.

2. A cutter bar having its entire upper and lower surfaces flat and continuous, and provided with a series of transverse slots open at the front side of the bar, a series of knives having shanks formed to enter said slots, and means for simultaneously locking, and releasing, the knives, said means being secured to a vertical edge of the bar.

3. A cutter bar having a series of transverse slots open at the front side of the bar, a series of knives having shanks formed to enter said slots, and a locking bar hinged to the cutter bar and provided with a series of locking tongues which are simultaneously movable crosswise of the slots, and adapted to simultaneously engage, and release, the knives.

4. A cutter bar having its entire upper and lower surfaces flat and continuous, and provided with a series of transverse slots extending through the bar from the front to the rear side thereof, a series of knives having shanks formed to enter said slots and project through the same, and means carried by the cutter bar for simultaneously locking, and unlocking, the knife shanks, said means being secured to a vertical edge of the bar, the projecting ends of the shanks facilitating the removal of the knives from the cutter bar when they are unlocked.

5. A cutter bar having a series of transverse slots open at the front side of the bar, a series of knives having slotted shanks constructed to enter the slots of said cutter bar, and a locking bar secured to the rear side of said cutter bar and provided with tongues adapted to enter the slots in the shanks of said knives, said locking bar being mounted to move perpendicular to the plane of said slots to lock and unlock said knives.

6. A cutter bar having a series of transverse slots open at the front side of the bar, a series of knives having slotted shanks constructed to enter the slots of said cutter bar, and a locking bar secured to the rear side of said cutter bar and provided with tongues adapted to enter the slots in the shanks of said knives, said locking bar being pivotally connected to said cutter bar.

7. A cutter bar having a series of transverse slots open at the front side of the bar, a series of knives having slotted shanks constructed to enter the slots of said cutter bar, and a locking bar secured to the rear side of said cutter bar and provided with tongues adapted to enter the slots in the shanks of said knives, said locking bar being pivotally connected at one end to the contiguous end of said cutter bar.

8. A cutter bar having a series of transverse slots open at the front side of the bar, a series of knives having shanks constructed to enter the slots of said cutter bar, and a locking bar for said knives pivotally connected to the rear side of said cutter bar.

9. A cutter bar having a series of transverse slots open at the front side of the bar, a series of knives having shanks constructed to enter the slots of said cutter bar, and a locking bar for said knives carried by said cutter bar and adapted to move perpendicularly to the slots to lock and unlock said knives.

In testimony whereof we have affixed our signatures, in presence of two witnesses.

JOHN H. POOLE.
ALFRED D. ABBENZELLER.

Witnesses:
C. F. BROWN,
P. W. PEZZETTI.